United States Patent Office.

FRANKLIN TRUMAN HUNTOON, OF FULTON CITY, ILLINOIS.

Letters Patent No. 103,747, dated May 31, 1870.

IMPROVED COMPOUND FOR CLEANING CLOTH AND OTHER FABRICS.

The Schedule referred to in these Letters Patent and making part of the same

To all whom it may concern:

Be it known that I, FRANKLIN TRUMAN HUNTOON, of Fulton City, in the county of Whiteside and State of Illinois, have invented a new and useful Cleansing Compound; and I do hereby declare the following to be a full, clear, and exact description thereof, which will enable others skilled in the art to which my invention appertains to make and use the same.

My invention has for its object to provide an improved cleansing compound which shall effectually remove dirt and stains of all descriptions from cloth and other fabrics without injuring the same.

In carrying out my invention for the manufacture of a compound to be put up in blocks or cakes for the market, I use the following ingredients in about the proportions mentioned:

One quart of skim milk and one quart of soft water are poured together into any suitable vessel and heated until ebullition occurs.

While this liquid is boiling the following ingredients are added:

Half pint sweet oil, two pounds beef tallow, quarter pint kerosene oil, and half pound soda ash, and the boiling continued for about two hours.

To the compound thus produced I add one and a half pound pulverized magnesia, three ounces of borax, and one pound of sal soda.

After boiling for about ten minutes, four ounces of spirits of turpentine, two ounces of spirits of ammonia, and six ounces of alcohol are added, and the whole mass poured into molds of the desired form and allowed to cool for use.

For the manufacture of a liquid compound I mix two gallons of skim milk and seven gallons of soft water in a suitable vessel and boil together, as before mentioned.

To this I add, in the following order, four pounds of tallow, one pound of soda-ash, one pound of oil-meal, one pint of kerosene oil, half pint of ammonia, one pint of turpentine, one and a half pint alcohol, and one pound of pulverized resin.

This compound should be allowed to boil, being constantly agitated, for about one hour before the ammonia, turpentine, and alcohol are added, and about five minutes afterward.

The whole is then removed from the fire, and after having been strained is ready for use.

Having thus described my invention,

What I claim as new, and desire to secure by Letters Patent, is—

The cleansing compound, consisting of the ingredients mixed together in the proportions and manner substantially as specified.

FRANKLIN TRUMAN HUNTOON.

Witnesses:
WM. J. MCCOY.
C. S. SMITH.